United States Patent
Beckwith et al.

(10) Patent No.: US 11,073,388 B2
(45) Date of Patent: Jul. 27, 2021

(54) NESTING LEVELING DEVICE

(71) Applicant: APEX BRANDS, INC., Apex, NC (US)

(72) Inventors: Jonathan Siebert Beckwith, Raleigh, NC (US); Tobias McKay Bridges, Holly Springs, NC (US); Trent Kahute, Atlanta, GA (US); Stephanie Lewis, Atlanta, GA (US); David Trettin, Atlanta, GA (US); Andrew Bauer, Atlanta, GA (US)

(73) Assignee: APEX BRANDS, INC., Apex, NC (US)

(*) Notice: Subject to any disclaimer, the term of this patent is extended or adjusted under 35 U.S.C. 154(b) by 143 days.

(21) Appl. No.: 16/346,306

(22) PCT Filed: Oct. 31, 2017

(86) PCT No.: PCT/US2017/059237
§ 371 (c)(1),
(2) Date: Apr. 30, 2019

(87) PCT Pub. No.: WO2018/081781
PCT Pub. Date: May 3, 2018

(65) Prior Publication Data
US 2019/0316905 A1    Oct. 17, 2019

Related U.S. Application Data

(60) Provisional application No. 62/496,872, filed on Oct. 31, 2016.

(51) Int. Cl.
*G01C 9/28* (2006.01)

(52) U.S. Cl.
CPC ........................ *G01C 9/28* (2013.01)

(58) Field of Classification Search
CPC .................... G01C 9/28; G01C 9/26
USPC ........................................... 33/381
See application file for complete search history.

(56) References Cited

U.S. PATENT DOCUMENTS

| 2,551,524 | A | * | 5/1951 | Bullivant | G01C 9/28 |
| | | | | | 33/374 |
| 3,104,477 | A | * | 9/1963 | Edwill | G01C 9/28 |
| | | | | | 33/374 |
| 4,152,838 | A | * | 5/1979 | Cook | G01C 9/28 |
| | | | | | 33/342 |

(Continued)

FOREIGN PATENT DOCUMENTS

| EP | 1933111 A1 | 6/2008 |
| WO | 2006079204 A1 | 8/2006 |

OTHER PUBLICATIONS

International Search Report and Written Opinion of PCT/US2017/059237 dated Mar. 2, 2018, all enclosed pages cited.

(Continued)

*Primary Examiner* — George B Bennett
(74) *Attorney, Agent, or Firm* — Burr & Forman, LLP

(57) ABSTRACT

A leveling device may include a first level portion having a first leveling vial disposed thereon, and a second level portion having a second leveling vial disposed thereon. The second level portion may be configured to be nested within the first level portion to define a fully nested configuration. The first and second level portions may be separable from each other to define a fully de-nested configuration.

20 Claims, 2 Drawing Sheets

(56) References Cited

U.S. PATENT DOCUMENTS

| | | | | |
|---|---|---|---|---|
| 4,928,395 A | * | 5/1990 | Good | G01C 9/24 |
| | | | | 33/374 |
| 6,041,510 A | * | 3/2000 | Huff | G01B 3/02 |
| | | | | 33/374 |
| 6,282,805 B1 | | 9/2001 | Cosentino | |
| 6,694,632 B1 | * | 2/2004 | Schooley | G01C 9/28 |
| | | | | 33/374 |
| 6,782,628 B2 | * | 8/2004 | Liao | G01C 9/28 |
| | | | | 33/384 |
| 7,562,463 B2 | | 7/2009 | Vaes | |
| 7,797,848 B2 | * | 9/2010 | Cobb | G01C 9/26 |
| | | | | 33/374 |
| 2002/0121025 A1 | * | 9/2002 | Leite | G01C 9/28 |
| | | | | 33/374 |
| 2016/0054124 A1 | * | 2/2016 | Schaefer | G01C 9/32 |
| | | | | 33/354 |
| 2020/0132455 A1 | * | 4/2020 | Sanders | G01C 9/34 |

OTHER PUBLICATIONS

Office Action from related Chinese application No. 201780081735.3 dated Nov. 13, 2020, all pages cited in its entirety.

* cited by examiner

NESTING LEVELING DEVICE

CROSS REFERENCE TO RELATED APPLICATIONS

This application claims priority to U.S. application No. 62/496,872 filed Oct. 31, 2016, the entire contents of which are hereby incorporated by reference in its entirety.

TECHNICAL FIELD

Example embodiments generally relate to leveling devices and, in particular, relate to a leveling device with nested pieces of differing sizes.

BACKGROUND

Leveling devices are commonly used to indicate whether a surface is horizontal (i.e., level) or vertical (i.e., plumb). Various types of leveling devices have been developed throughout the years. However, a spirit level is a particularly popular leveling device. The spirit level (or bubble level) typically uses a glass or plastic vial that has a constant inner diameter that is provided with a liquid therein. The liquid is often colored, at least to some degree, for visibility, and does not quite completely fill the vial. The resulting bubble formed by incomplete filling of the vial is then allowed to rest at an exposed point of the vial at which a slight curve may be formed. The bubble rests in the center (e.g., at the highest point) when the surface on which the spirit level is rested is horizontal or plumb (depending on the orientation of the vial).

A traditional carpenter's level employs an elongated rectangular member that may include both a horizontal and a vertical vial within a unitary structure. However, the size of the unitary structure is fixed. Thus, for smaller or larger surfaces where leveling is desired, it is common for different sized carpenter levels to be employed.

BRIEF SUMMARY OF SOME EXAMPLES

Some example embodiments may enable the provision of a nesting level that allows multiple different sizes of levels to be combined into a single nested structure. The levels can be used in a fully nested or partially nested configuration, as well as being capable of being used individually in a fully de-nested configuration.

In an example embodiment, a leveling device is provided. The leveling device may include a first level portion having a first leveling vial disposed thereon, a second level portion having a second leveling vial disposed thereon, and a third level portion having a third leveling vial disposed thereon. The second level portion may be configured to be nested within the first level portion, and the third level portion may be configured to be nested within the second level portion to define a fully nested configuration. The first, second and third level portions may be separable from each other to define a fully de-nested configuration.

In another example embodiment, an alternative leveling device may be provided. The leveling device may include a first level portion having a first leveling vial disposed thereon, and a second level portion having a second leveling vial disposed thereon. The second level portion may be configured to be nested within the first level portion to define a fully nested configuration. The first and second level portions may be separable from each other to define a fully de-nested configuration. Third, fourth, or even more level portions can also be provided in some example embodiments and, in all cases, the respective different level portions may be nested within an adjacently larger sized portion.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1B:
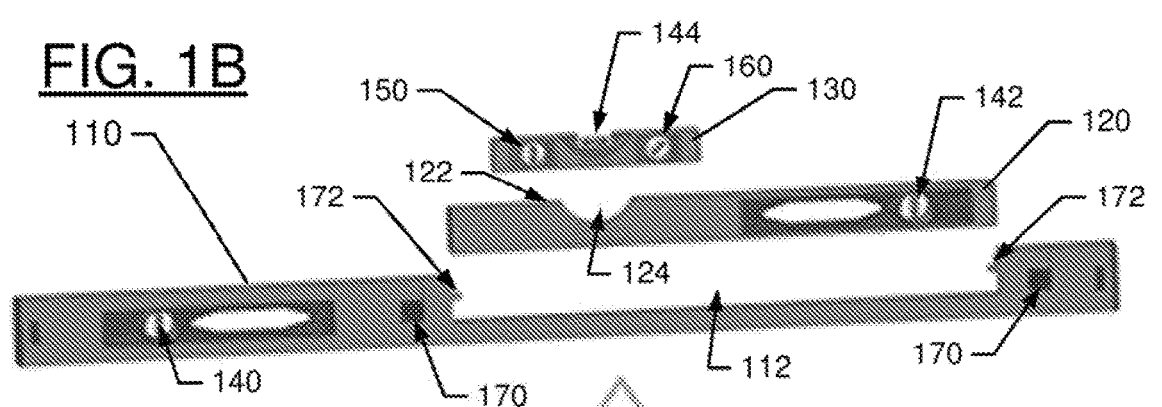
FIG. 1B illustrates the nesting level in a fully de-nested configuration according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1A:
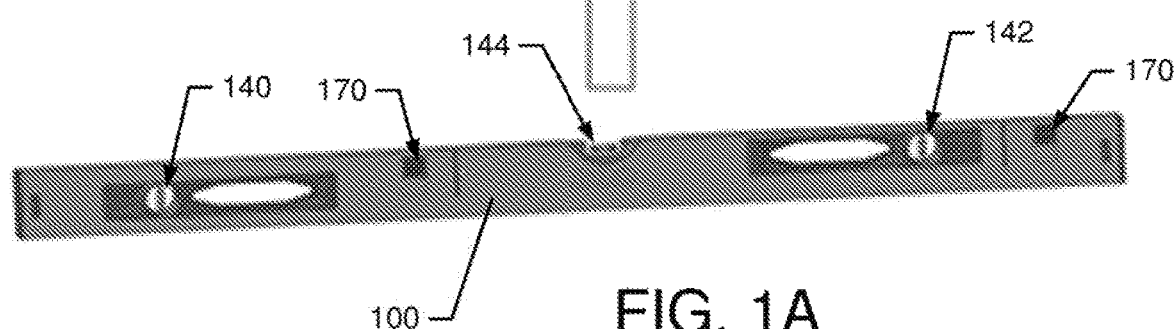
FIG. 1A illustrates a perspective view of a nesting level in a fully nested configuration according to an example embodiment.

As indicated above, some example embodiments may relate to the provision of a nesting level that provides great flexibility relative to employing a leveling device. As shown in FIGS. 1A and 1B, the nesting level 100 may include a first level portion 110, a second level portion 120, and a third level portion 130. In this example, the first level portion 110 is the largest component and defines the length of the nesting level 100 in the fully nested configuration shown in FIG. 1A. Meanwhile, the second level portion 120 fits into a receiving slot 112 defined at a portion of the first level portion 110, and the third level portion 130 fits into a receiving orifice 122 formed in a top surface of the second level portion 120. Thus, for example, the first and second level portions 110 and 120 may each have the same (or substantially the same) width along their respective lengths. However, the height of the first level portion 110 may be larger than the height of the second level portion 120 so that the receiving slot 112 is formed so that the height dimension of the first level portion 110 is substantially uniform along the length of the first level portion 110 only when the second level portion 120 is nested in the first level portion 110. Accordingly, the receiving slot 112 may extend through the entire width of the first level portion 110 over the extent of the receiving slot 112, and the receiving slot 112 may have a length, width and height that is substantially the same as the length, width and height of the second level portion 120.

The receiving orifice 122 formed in the second level portion 120 to receive the third level portion 130 may, however, not have the same width as the second level portion 120. Instead, the third level portion 130 may be thinner in width and height than the second level portion 120. As such, the sides and the bottom of the third level portion 130 may be substantially covered by sides and the bottom of the second level portion 130 when the third level portion 130 is nested in the second level portion 130. In some embodiments, the second level portion 120 may further define an exposure window 124 through which a portion of the third level portion 130 may be visible as described in greater detail below. However, it should be appreciated that the third level portion 130 may sometimes fit into a receiving slot formed into the second level portion 120 that may be similar to that formed in the first level portion 110. In such an example, the second and third level portions 120 and 130 may also each have substantially the same width.

As shown in FIG. 1A, the nesting level 100 may, when in the fully nested configuration, provide visibility of at least a first leveling vial 140, a second leveling vial 142, and a third leveling vial 144. The first leveling vial 140 may be a plumb vertical vial, and may be disposed on the first level portion 110. The second leveling vial 142 may also be a plumb vertical vial, and may be disposed on the second level portion 120. The third leveling vial 144 may be a horizontal vial that is disposed on the third level portion 130. In the fully nested configuration, at least one vial from each of the first, second and third level portions 110, 120 and 130 may therefore be visible. However, as shown in FIG. 1B, the third level portion 130 may include additional vials that are not visible in the fully nested configuration, but are visible in the fully de-nested configuration. In this regard, for example, the third level portion 130 may not only include the always visible (e.g., in both fully nested and de-nested configurations) third leveling vial 144, but may further include a fourth leveling vial 150 and a fifth leveling vial 160. The fourth leveling vial 150 may also be a plumb vertical vial, and the fifth leveling vial 160 may be a 45 degree vial that has a 45 degree inclination.

Accordingly, each of the first, second and third level portions 110, 120 and 130 may include at least one visible leveling vial in the fully nested configuration. And each of the first, second and third level portions 110, 120 and 130 may include at least one plumb vertical vial. However, in some examples, the third level portion 130 may only have its corresponding plumb vertical vial visible when the third level portion 130 is extracted from (or de-nested from) the second level portion 120. The third level portion 130 may, in some cases, have at least one leveling vial that is visible at all times, and at least one leveling vial that is only visible when the third level portion 130 is extracted from (or de-nested from) the second level portion 120. In particular, the third leveling vial 144 (which is a horizontal vial—and the only horizontal vial) may be visible regardless of the configuration because the third leveling vial 144 may be aligned with the exposure window 124 when the third level portion 130 is inserted into (or nested with) the second level portion 120.

In some cases, the first, second and third level portions 110, 120 and 130 may be operably coupled to each other through tongue and groove, snap fittings, or other releasable connections. As such, in some cases, the first, second and third level portions 110, 120 and 130 may each be locked or otherwise retained in connection to each other in the fully nested configuration. However, in other cases, the first, second and third level portions 110, 120 and 130 may not necessarily be locked in connection with each other, but may be slidably coupled in a manner that permits relatively easy de-nesting. In still other cases, a combination of lockable connections and non-lockable connections may be employed.

Figure 2:
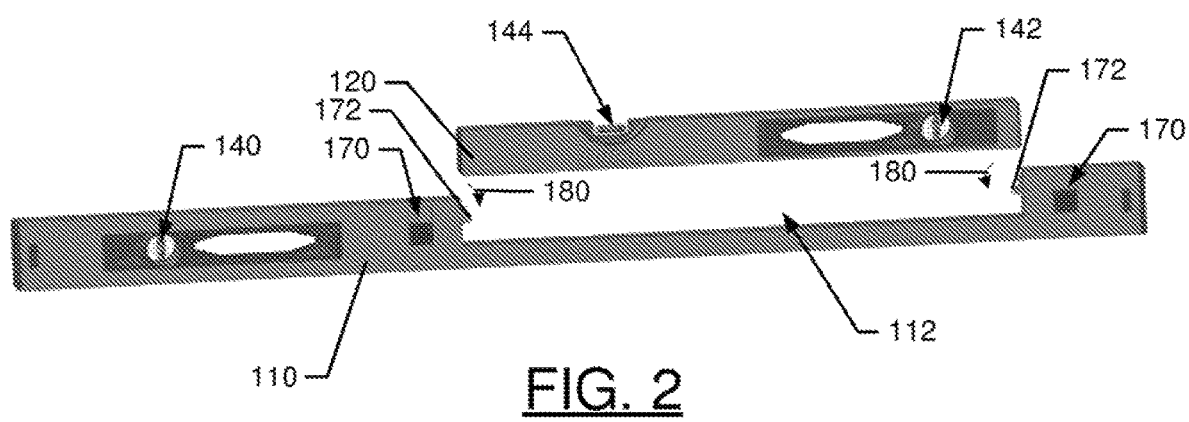
FIG. 2 illustrates the nesting level in a partially de-nested configuration according to an example embodiment.

As an example of a lockable connection, locking tabs 170 may be provided on opposing sides of the receiving slot 112 of the first level portion 110. The locking tabs 170 may be operable to reposition protrusions 172 that may extend into or be retracted out of reception slots formed in opposing ends of the second level portion 120 to lock the second level portion 120 into connection with the first level portion 110 or unlock to permit de-nesting. In the example of FIGS. 1A, 1B, and 2 the locking tabs 170 may move in a direction substantially perpendicular to the longitudinal length of the nesting level 100 to shift between locked and unlocked states. However, other arrangements are also possible. As can best be seen from FIG. 2, as the second level portion 120 moves into the receiving slot 112, the protrusions 172 may be pivoted into a locked position (as shown by arrow 180) to lock the second level portion 120 into the receiving slot 112.

In some examples, the receiving slot 112 and the receiving orifice 122 may each be offset from center on their respective level portions. However, when in the fully nested configuration, the offsets may combine to place the exposure window 124 and the third leveling vial 144 directly in the longitudinal center of the nesting level 100 and on the top side thereof. The bottom side of each respective level portion may be substantially straight and the leveling vials may each be disposed substantially in a center of the respective level portions (i.e., on the longitudinal centerline of each respective portion). However, this arrangement provides that the second leveling vial 142 will be centered along the longitudinal centerline of the second level portion 120, but will not be centered along the longitudinal centerline of the first level portion 110 when the second level portion 120 is nested with the first level portion 110.

Example embodiments allow for the provision of leveling devices of multiple scales or sizes, all within a single nestable arrangement. Small, midsize and large size scales can all be provided, and each scale can provide both horizontal and vertical leveling. In this regard, the third level portion 130 has the horizontal leveling vial (e.g., the third leveling vial 144) that is used for horizontal leveling, and the fourth leveling vial 150 for plumb vertical leveling when the third level portion 130 is fully de-nested, thereby defining the smallest level size. Meanwhile, when the third level portion 130 and second level portion 120 are nested together (but de-nested relative to the first level portion 110), then a mid-sized level (e.g., 24 inches in length, although other lengths are possible) is formed with the third leveling vial 144 again providing horizontal leveling and the second leveling vial 142 of the second level portion 120 providing the plumb vertical leveling. Finally, when the first, second and third level portions 110, 120 and 130 are in the fully nested configuration, the largest sized level is formed (e.g., 48 inches in length, although other lengths are possible). In the large sized level configuration, the third leveling vial 144 again provides horizontal leveling and the second leveling vial 142 of the second level portion 120 and first leveling vial 140 of the first level portion 110 each provide the plumb vertical leveling. Larger sizes may also be added by nesting the first, second, and third level portions 110, 120 and 130 into a larger sized level portion. Moreover, some example embodiments could be produced with as few as two nesting level portions to as many nesting level portions as may be desired or practical.

A leveling device may include a first level portion having a first leveling vial disposed thereon, a second level portion having a second leveling vial disposed thereon, and a third level portion having a third leveling vial disposed thereon. The second level portion may be configured to be nested within the first level portion, and the third level portion may be configured to be nested within the second level portion to define a fully nested configuration. The first, second and third level portions may be separable from each other to define a fully de-nested configuration.

The leveling device and/or its components may include a number of modifications, augmentations, or optional additions, some of which are described herein. For example, in the fully nested configuration, at least one leveling vial on each of the first, second and third level portions, respectively, may be visible. In some cases, each one of the first, second and third level portions may include a respective plumb vertical leveling vial. In an example embodiment, only the third level portion may include a horizontal leveling vial. In some cases, the horizontal leveling vial may be disposed at a longitudinal center of the third level portion. In an example embodiment, in the fully nested configuration, the horizontal leveling vial may be disposed at a longitudinal center of the first level portion. In some cases, in the fully nested configuration, the horizontal leveling vial may not be disposed at a longitudinal center of the second level portion. In an example embodiment, the third level portion may further include a 45 degree orientation vial. In an example embodiment, the first and second level portions may have the same width, but a different length and height. In some cases, the second and third level portions have different height, length and width. In an example embodiment, the second level portion comprises an exposure window through which the horizontal leveling vial is visible when the third level portion is nested in the second level portion. In some cases, the first level portion may define a receiving slot inside which the second level portion is retained, and the first level portion may further include locking tabs on opposing sides of the receiving slot to enable the second level portion to be locked in the receiving slot.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A leveling device comprising:
a first level portion having a first leveling vial disposed thereon; and
a second level portion having a second leveling vial disposed thereon,
wherein the second level portion is configured to be nested within the first level portion to define a fully nested configuration, and
wherein the first and second level portions are separable from each other to define a fully de-nested configuration.

2. The leveling device of claim 1, further comprising a third leveling portion having a third leveling vial disposed thereon, wherein the third level portion is configured to be nested within the second level portion to define the fully nested configuration, and
wherein the first, second, and third level portions are separable from each other to define the fully de-nested configuration.

3. The leveling device of claim 2, wherein, in the fully nested configuration, at least one leveling vial on each of the first, second and third level portions, respectively, is visible.

4. The leveling device of claim 2, wherein each one of the first, second and third level portions includes a respective plumb vertical leveling vial.

5. The leveling device of claim 4, wherein only the third level portion includes a horizontal leveling vial.

6. The leveling device of claim 5, wherein the horizontal leveling vial is disposed at a longitudinal center of the third level portion.

7. The leveling device of claim 6, wherein, in the fully nested configuration, the horizontal leveling vial is disposed at a longitudinal center of the first level portion.

8. The leveling device of claim 7, wherein, in the fully nested configuration, the horizontal leveling vial is not disposed at a longitudinal center of the second level portion.

9. The leveling device of claim 5, wherein the third level portion further comprises a 45 degree orientation vial.

10. The leveling device of claim 1, wherein the first and second level portions have the same width, but a different length and height.

11. The leveling device of claim 10, wherein the second and third level portions have different height, length and width.

12. The leveling device of claim 10, wherein the first, second and third level portions each have the same width, and each also have different height and lengths.

13. The leveling device of claim 5, wherein the second level portion comprises an exposure window through which the horizontal leveling vial is visible when the third level portion is nested in the second level portion.

14. The leveling device of claim 1, wherein the first level portion defines a receiving slot inside which the second level portion is retained, and
wherein the first level portion further comprises locking tabs on opposing sides of the receiving slot to enable the second level portion to be locked in the receiving slot.

15. The leveling device of claim 13, wherein the first and second level portions have the same width, but a different length and height.

16. The leveling device of claim 13, wherein the second and third level portions have different height, length and width.

17. The leveling device of claim 13, wherein the first, second and third level portions each have the same width, and each also have different heights and lengths.

18. The leveling device of claim 13, wherein the third level portion includes the only horizontal leveling vial.

19. The leveling device of claim 14, wherein the first and second level portions have the same width, but a different length and height.

20. The leveling device of claim 14, wherein the locking tabs are configured to move in a direction perpendicular to the longitudinal length of the nesting level.

\* \* \* \* \*